United States Patent [19]
Thompson et al.

[11] Patent Number: 6,031,852
[45] Date of Patent: Feb. 29, 2000

[54] RAPID ACOUSTOOPTIC TUNER AND PHASE-SHIFTER

[75] Inventors: David C. Thompson; George E. Busch; Carl W. Wilson; Thomas J. Zaugg; Charlie E. M. Strauss; Dennis K. Remelius; Tsutomu Shimada, all of Los Alamos, N.Mex.

[73] Assignee: The Regents of the University of California, Los Alamos, N.Mex.

[21] Appl. No.: 09/087,718

[22] Filed: May 29, 1998

Related U.S. Application Data

[60] Provisional application No. 60/048,039, May 30, 1997.

[51] Int. Cl.$^7$ ....................................................... H01S 3/10
[52] U.S. Cl. .................... 372/20; 372/9; 372/92; 372/98
[58] Field of Search ............................ 372/20, 913, 98, 372/912; 359/285

[56] References Cited

U.S. PATENT DOCUMENTS

| | | | |
|---|---|---|---|
| 3,531,184 | 9/1970 | Adler | 359/310 |
| 4,332,441 | 6/1982 | Margolis | 359/310 |
| 4,344,675 | 8/1982 | Yao | 359/310 |
| 4,448,494 | 5/1984 | Freyre | 359/285 |
| 4,687,958 | 8/1987 | Sommargren | 359/285 |
| 4,707,835 | 11/1987 | Mocker . | |
| 4,736,382 | 4/1988 | O'Meara | 372/20 |
| 5,140,599 | 8/1992 | Trutna, Jr. et al. | 372/20 |
| 5,263,037 | 11/1993 | Trutna et al. . | |
| 5,883,734 | 3/1999 | Suzuki et al. | 372/703 |

OTHER PUBLICATIONS

G. A. Coquin et al., "Electronically Tunable External Cavity Semiconductor Laser," Electron. Lett. 24, 599 (1988).
L. J. Denes et al., "Rapid Tuning Mechanism for CO2 Lasers," Proc. SPIE 894, 78 (1988).
Lynn D. Hutcheson et al., "Rapid Acousto–Optic Tuning of a Dye Laser," Appl. Opt. 13, 1395 (1974).
William Streifer et al., "Analysis of a Dye Laser Tuned by Acousto–Optic Filter," Appl. Phys. Lett. 17,335 (1970).
K. Doughty et al., "Electron Tuning of LEC Lasers," Proc. SPIE 1703, 136 (1992).

*Primary Examiner*—Leon Scott, Jr.
*Attorney, Agent, or Firm*—Samuel F. Freund

[57] ABSTRACT

The present invention describes the use of a pair of acoustooptic devices in a laser or other optical resonator to produce a wavelength-dependent deflection of the light without incurring a net frequency shift. This permits rapid electronic tuning of the resonator wavelength, as well as rapid electronic variation of cavity loss, out-coupling fraction, and round-trip phase shift. The dispersive quality of acoustooptic devices in transmission is utilized as a reflection grating substitute. Two mirrors, one an output coupler, a gain medium and two acoustooptic devices arranged for maximum efficiency such that the incident and diffracted beams are approximately at the Bragg angle for each acoustooptic device permit the laser wavelength to be determined by the acoustic frequency.

6 Claims, 5 Drawing Sheets

RAPID ACOUSTOOPTIC TUNER AND PHASE-SHIFTER

This application claims the benefit of U.S. Provisional Application No. 60/048,039, filed May 30, 1997.

FIELD OF THE INVENTION

The present invention relates generally to the control of laser output and, more particularly, to the use of acoustooptic devices for rapidly tuning laser output wavelengths. The invention was made with government support under Contract No. W-7405-ENG-36 awarded by the U.S. Department of Energy to the Regents of the University of California. The government has certain rights in the invention.

BACKGROUND OF THE INVENTION

Many lasers are capable of operating at a number of wavelengths, either due to a broad band of emission such as in dye or in many solid-state lasers, or due to multiple discrete lines such as in molecular lasers like $CO_2$. Tunable lasers have broad application in spectroscopy and in optical communications. In these applications rapid electronic control of wavelength is an advantage. High-speed tuning is particularly advantageous for remote sensing in that it provides a higher rate of data acquisition, and allows spectroscopic measurements to be achieved in short times compared to the time for platform motion or for atmospheric changes. Tuning rates of greater than 100 kHz are desirable.

Rapidly tuned lasers have most often used small galvanometer-driven mirrors or gratings to randomly access wavelengths at rates up to about 200 Hz or have used rapidly rotating mirrors or prisms to sequentially tune through wavelengths at speeds up to 40 kHz in bursts at a few hundred Hz. However, tuning speeds remain limited by inertia, mechanisms are bulky and difficult to align, and higher speeds and random access are difficult to achieve.

Acoustooptic (AO) devices have been used to replace these slow-moving parts with faster devices which are electronically controlled and have no moving parts. In *Design and Fabrication of Acousto-Optic Devices*, A. P. Goutzoulis and D. R. Pape, eds., Marcel Dekker, Inc. (New York, 1994) a useful review of a variety of AO devices, including modulators (AOMs), deflectors (AODs) and AO tunable filters (AOTFs) may be found.

An AOM is a device generally having a single acoustic transducer for generating a radio-frequency (RF) sound wave propagating approximately transverse to the optical beam path therethrough, and is usually used for modulating the intensity of light. This modulation occurs by varying the intensity of the RF signal to the transducer and thus the fraction of light diffracted out of the original (zero-order) direction into the first-order beam. For this application, usually the carrier frequency is fixed, and the directions of zero- and first-order beams relative to the acoustic-wave propagation are fixed. By contrast, the function of an AOD is to vary the deflection angle of the beam by varying the radio frequency. However, in order to maintain efficiency as the angle of the first-order output beam varies, it is customary to change the direction of propagation of the acoustic beam by using a phased-transducer array. An AOTF utilizes a birefringent crystal and an acoustooptic interaction between light of different polarizations. That is, input light of one polarization is converted to another polarization only for a narrow wavelength range determined by the acoustic frequency, with the filtered light selected by a polarizer or, in some geometrical situations, by a different propagation direction in the birefringent crystal. Acoustooptic tunable filters can be classified as collinear or noncollinear depending on whether the light and acoustic waves propagate in the same direction.

Acoustooptic tuning of a dye laser was first accomplished using an AOTF by Taylor et al., and reported in "Electronic Tuning Of A Dye Laser Using The Acousto-Optic Filter," Appl. Phys. Lett. 19, 269 (1971). In "Rapid Acousto-Optic Tuning Of A Dye Laser," by Lynn D. Hutcheson and R. S. Hughes, Appl. Opt. 13, 1395 (1974), a dye laser was tuned using an AO deflector to scan the laser beam across a grating. However, on each pass through the AO device, the diffracted beam is frequency shifted relative to the input beam by the acoustic frequency, with the direction of the shift depending on the relative orientation of the optical and acoustic beams. This shift accumulates as the light makes multiple passes of the cavity and prevents single-frequency operation (See, e.g., "Analysis Of A Dye Laser Tuned By Acousto-Optic Filter," by William Streifer and John R. Whinnery, Appl. Phys. Lett. 17, 335 (1970)). In the case of narrow gain lines, such as in low-pressure $CO_2$, if the gain is low or many round trips inside a laser cavity are required, the frequency shift prevents laser output altogether.

A number of approaches have been proffered for eliminating this shift. In "Optical Oscillator Sweeper," U.S. Pat. No. 5,263,037, which issued to William R. Trutna and Paul Zorabedian on Nov. 16, 1993, two AOTF's were inserted into the laser cavity and operated so that their frequency shifts were of opposite sign and canceled each other. In "Electronically Tunable External Cavity Semiconductor Laser," by G. A. Coquin and K. W. Cheung, Electron. Lett. 24, 599 (1988), an intracavity AOTF and an AO modulator were employed, the AOTF providing the tunability and the modulator serving only to compensate for the frequency shift of the AOTF. In "Rapid Tuning Mechanism For $CO_2$ Lasers," Proc. SPIE 894, 78 (1988), L. J. Denes et al. used a single collinear AOTF to tune a TEA $CO_2$ laser. The acoustic wave was reflected at one end of the AOTF to create counterpropagating acoustic waves. Two passes of the laser light through the AOTF produced components at the unshifted frequency and at up- and down-shifted frequencies. While the one-half of the light that is unshifted in frequency allows operation on the relatively narrow $CO_2$ lines, a 50% round-trip loss is experienced that may not be acceptable for lower-gain lasers.

Acoustooptic tunable filters as laser tuners have some limitations, particularly in the infrared where suitable crystals are not widely available. Acoustooptic deflectors and modulators have been used as alternatives. In "Electron Tuning Of LEC Lasers," by K. Doughty and K. Cameron, Proc. SPIE 1703, 136 (1992), a pair of AODs was used to cancel the frequency shifts, the AODs being oriented such that the deflection angles also canceled in whole or in part. In one configuration, two AODs constructed of different materials were used in cooperation with a grating so that the frequency shifts canceled exactly, but a residual deflection remained. However, only limited tuning range was reported. A proposed configuration would use identical deflectors, with exact cancellation of frequency shift and deflection angle, to produce a frequency-dependent displacement, which would be converted by a lens to an angular deflection at a grating. In "Rapid Wavelength Switching Of IR Lasers With Bragg Cells," U.S. Pat. No. 4,707,835, which issued to Hans W. Mocker on Nov. 17, 1987, a ring laser having an additional coupled cavity containing one double-passed AO modulator was proposed. This coupled cavity adds significant complexity. Moreover, while Mocker claims that limited AOM efficiency makes the coupled cavity necessary, the disclosed configuration requires high AOM efficiency to prevent lasing at unselected higher-gain wavelengths. A different configuration proposed by Mocker uses two separate AO devices deployed in series to leave the signal frequency unshifted, but would be expected to provide poor wavelength resolution due to the cancellation of the deflection angles. That is, the light is simply displaced by the two devices, with individual wavelengths simply retracing their paths after reflection from a cavity mirror. An iris inserted into the laser cavity next to the totally reflecting mirror may provide limited resolution of the laser wavelengths.

Accordingly, it is an object of the present invention to provide a laser which is capable of rapid, high-resolution output wavelength tuning and cavity parameter control with the use of highly efficient acoustooptic elements and simple optics.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the wavelength tunable laser hereof may include: a reflection grating; a gain medium for providing amplification of a laser beam in a chosen wavelength range; means for exciting the gain medium; a first acoustooptic deflector located between the gain medium and the reflection grating for providing a first angular deflection of the laser beam; at least one first transducer for generating an acoustic wave in the first acoustooptic deflector; a first source of radio-frequency electrical power for providing radio-frequency energy to the at least one first transducer; a second acoustooptic deflector located between the first acoustooptic deflector and the reflection grating for providing a second angular deflection of the laser beam; at least one second transducer for generating an acoustic wave in the second acoustooptic deflector; a second source of radio-frequency electrical power for providing radio-frequency energy to the at least one second transducer, wherein the first acoustooptic deflector and the second acoustooptic deflector are operated such that no shift occurs in the frequency of the laser beam, and the first angular deflection of the laser beam and the second deflection of the laser beam are additive; and an output coupler located on the side of said gain medium away from said first acoustooptic deflector such that an optical cavity is formed capable of supporting amplification of the laser beam in the chosen wavelength range and laser output therefrom, whereby the wavelength of the laser beam is tuned by varying the frequency of the first source of radio frequency and of the second source thereof.

Preferably, the frequency of the first source of radio-frequency electrical power and the frequency of the second source of radio-frequency electrical power are substantially the same.

Preferably also, the first acoustooptic deflector and the second acoustooptic deflector are disposed approximately at the Bragg angle relative to the laser beam, and are maintained at approximately the Bragg angle for different wavelengths of the laser beam by tilting the direction of propagation of the acoustic wave generated therein by action of the at least one first transducer and the at least one second transducer, respectively.

In another aspect of the present invention, in accordance with its objects and purposes, the wavelength tunable laser hereof may include: an optical reflector; a gain medium for providing amplification of a laser beam in a chosen wavelength range; means for exciting the gain medium; a first acoustooptic modulator located between the gain medium and the optical reflector for providing a first angular deflection of the laser beam; at least one first transducer for generating an acoustic wave in the first acoustooptic modulator; a first source of radio-frequency electrical power for providing radio-frequency energy to the at least one first transducer; a second acoustooptic modulator located between the first acoustooptic modulator and the optical reflector for providing a second angular deflection of the laser beam; at least one second transducer for generating an acoustic wave in the second acoustooptic modulator; a second source of radio-frequency electrical power for providing radio-frequency energy to the at least one second transducer, wherein the first acoustooptic modulator and the second acoustooptic modulator are operated such that no shift occurs in the frequency of the laser beam, and the first angular deflection of the laser beam and the second deflection of the laser beam are additive; and an output coupler located on the side of the gain medium away from the first acoustooptic modulator such that an optical cavity is formed capable of supporting amplification of the laser beam in the chosen wavelength range and laser output therefrom, whereby the wavelength of the laser beam is tuned by varying the frequency of the first source of radio-frequency electrical power and of the second source thereof.

It is preferred that the frequency of the first source of radio frequency and the frequency of the second source of radio frequency are substantially the same.

It is also preferred that the first acoustooptic modulator and the second acoustooptic modulator are disposed approximately at the Bragg angle relative to the laser beam.

Benefits and advantages of the present invention include electronic tuning of the wavelength of lasers and other optical cavities using no moving parts. All required components are readily available and are technically mature. The control systems use standard RF technology and avoid the use of the high voltages needed for electrooptic components. Acoustooptic modulators are simple, rugged and available in many materials and for many frequency and wavelength ranges. Indeed, standard commercial acoustooptic devices will be suitable in many cases

BRIEF DESCRIPTION OF THE DRAWINGS

The accompanying drawings, which are incorporated in and form a part of the specification, illustrate several embodiments of the present invention and, together with the description, serve to explain the principles of the invention. In the drawings.

DETAILED DESCRIPTION

Briefly, the present invention utilizes a pair of acoustooptic devices driven by a pair of amplitude-modulated, variable-frequency sources. The AO devices are arranged such that their respective frequency shifts cancel, but in a manner whereby the deflection angles of the laser beam add. Since AO devices are themselves dispersive and behave as transmission gratings, a reflective grating is unnecessary. The preferred embodiment of the present invention then includes a mirror which forms one end of the optical cavity, a pair of acoustooptic modulators operated and oriented as described above, whereby the wavelength of the laser light is directly determined by the acoustic frequency, a gain medium, and an output coupler. Since RF bandwidths of the order of an octave are achieved by AO devices, wide tuning ranges are possible. The discrimination against other, nearby wavelengths is determined as for a grating by the number of grating "lines" illuminated. If the AOMs are both operated at the Bragg angle for the incident and diffracted light beams, efficiency is high, and commercially available modulators may be used intracavity. For example, commercially available germanium modulators may be used intracavity in the 9–11 μm region for a cw $CO_2$ laser. The time required to change optical wavelengths is determined by the transit time of the acoustic wave across the optical beam and is typically 1–10 μs, permitting greater than 100 kHz tuning rates.

Figure 1:
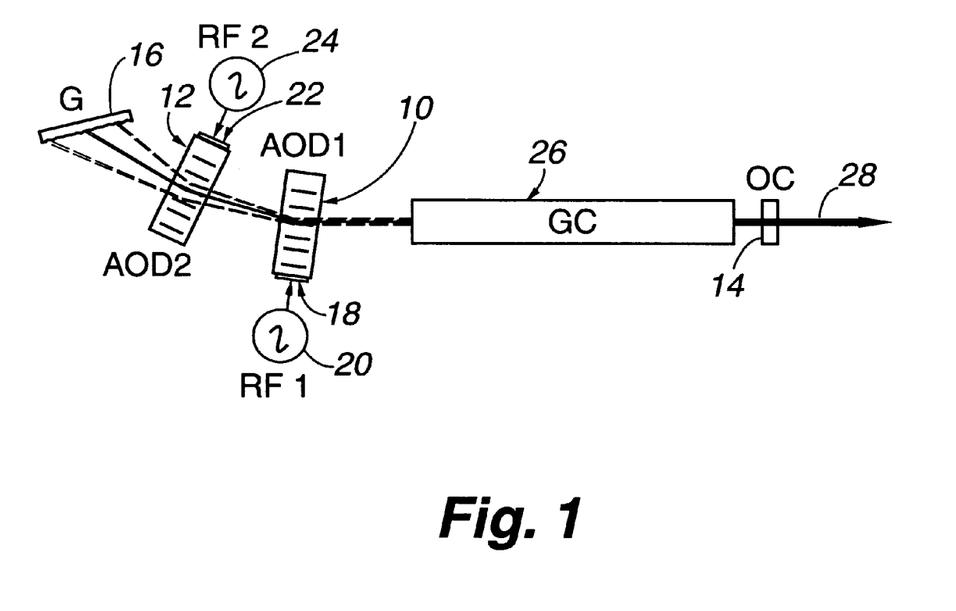
FIG. 1 is a schematic representation of a first embodiment of the tunable laser of the present invention showing the laser cavity including an output coupler, a gain cell, a pair of acoustooptic deflectors, and a grating.

Reference will now be made in detail to the present preferred embodiments of the invention, examples of which are illustrated in the accompanying drawings. Similar or identical structure are identified using identical callouts. Turning now to FIG. 1, a schematic representation of one embodiment of the present invention is shown. A pair of acoustooptic deflectors (AODs), 10 and 12, are placed in an optical cavity formed by output coupler, 14, and reflection grating, 16. An acoustic wave, which remains approximately at the Bragg angle to the laser beam in the optical cavity as the laser beam is deflected by AOD 10, is generated by phased transducer array, 18, which is driven by RF generator, 20. Although a single transducer can be used to convert RF electrical power to an acoustic wave, a phased array of transducers is used to provide higher efficiency over a wide range of acoustic frequencies and deflection angles. Radio-frequency generator 20 includes means for varying the RF. In the most general case, the RF generator may modulate the RF power to the AODs, but the transverse acoustic wave is launched in approximately the opposite direction relative to the transmitted light beam in AOD 12 to that of AOD 10, shift the phase of the RF to each device, and drive the array of transducers on each deflector, so as to give the appropriate angle of propagation for the acoustic wave. Transducer, 22, and RF generator, 24, provide the same function for AOD 12. Although the more general situation of RF generators, 20 and 24, being separated, and perhaps operating at different frequencies, is shown in FIG. 1, it is also possible that one, variable-frequency RF generator might be employed to drive both transducers. Additionally, the two AODs are arranged such that the frequency shifts introduced into the laser beam cancel, but the deflection angles introduced into the laser beam are additive. The RF directed into the deflectors controls the deflection angle and thus the angle at the grating, 16, which in turn determines the wavelength selected by the optical cavity. This embodiment has the advantages of the high dispersion (and therefore resolution) of the grating and simple optics. However, maintaining high efficiency through the deflectors requires precise control of the direction of the acoustic waves in the AODs, which introduces significant complexity into the AODs and the associated control electronics. It is particularly difficult to maintain high AO diffraction efficiency over a large angular range, especially for second deflector 12 which has variable angles for both incident and diffracted beams. In addition, the motion of the beam requires increased sizes for both second deflector 12 and the grating 16. Rapidly tunable laser output from the apparatus of FIG. 1 is shown as beam, 28.

Figure 2:
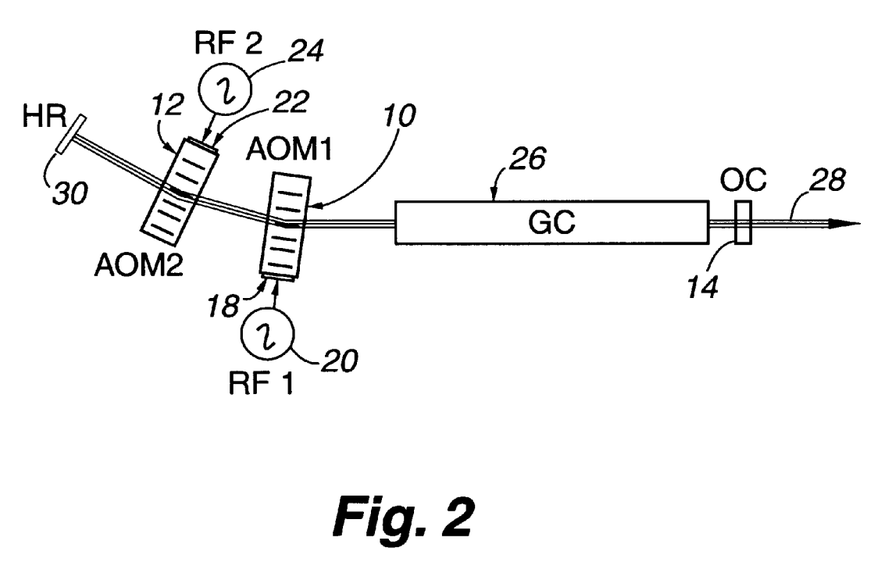
FIG. 2 is a schematic representation of a second embodiment of the tunable laser of the present invention showing the laser cavity including an output coupler, a gain cell, a pair of acoustooptic modulators, and a high-reflectivity mirror which replaces the reflective grating of FIG. 1 hereof.

Since AO devices are themselves dispersive, being essentially transmission gratings, a reflection grating is not necessary. A preferred configuration of the present apparatus is shown in FIG. 2. The optical cavity is now formed by high-reflectivity plane mirror, 30, which replaces the reflection grating of FIG. 1, and output coupler 14. Acoustooptic modulators (AOMs) 10 and 12 are used in place of the AODs of FIG. 1, and both devices are disposed at the Bragg angle, $\theta_B$. Radio-frequency generation devices 20 and 24, respectively, and transducers 18 and 22, respectively, are much simpler than those required for AODs, since a simple acoustic wave having a fixed propagation direction approximately transverse to the transmitted light beam is sufficient. As in FIG. 1, the radio-frequency sources 20 and 24, respectively, provide the variable-frequency RF power to generate the acoustic waves. In the most general situation, these sources may modulate the RF power to the AOMs and shift the phase of the RF to each transducer. Without a grating present, the lasing wavelength is determined by the Bragg condition for each device:

$$\frac{\lambda v}{2V_a} = \sin\theta_B$$

With the constant deflection angle, $2\theta_B$, for each device determined by the cavity geometry, the lasing wavelength, $\lambda$, is directly determined by the acoustic frequency $v$ for a given acoustic velocity $V_a$. Since RF bandwidths of the order of an octave or more are routinely achieved for AO devices, wide tuning ranges are possible, limited in most cases by the spectral width of gain medium, 26. The discrimination against other nearby wavelengths is determined as for a grating by the number of grating "lines" illuminated. In the apparatus of FIG. 2, this is the number of acoustic wavelengths illuminated by the beam, multiplied by four, due to the two passes through the two AO devices. While the dispersion may be somewhat lower than that for a grating, this can be compensated for, if necessary, by expanding the transverse size of the beam with an afocal telescope located in the laser cavity between the gain medium and AOM 10. If the size of the AO modulator in the direction perpendicular to both the acoustic and optical beams is limited, a cylindrical telescope can be used to expand the optical beam in the direction of the acoustic wave only. Since the AO modulators are always operated at the Bragg angle, standard AO modulators rather than AODs can be used, if desired, with a substantial improvement in efficiency. Diffraction efficiencies of >97% have been measured for commercially available germanium modulators in the 9–11 $\mu$m region for use in a $CO_2$ laser cavity. Therefore, intracavity use of efficient AOMs is possible, even for relatively low-gain lasers such as cw-pumped lasers that might be used for a rapidly tuned laser. However, since the RF power required to reach maximum diffraction efficiency for an AOM varies in proportion to the square of the wavelength, variation of the RF power as the wavelength is tuned is necessary if the highest efficiencies are to be achieved. Since the beam position on the modulators does not change, only moderate device apertures are required. The time required for changing laser wavelengths is determined by the transit time of the acoustic wave across the optical beam and is typically of the order of 1–10 $\mu$s.

The apparatus of FIG. 2 was used with a cw $CO_2$ gain medium. Measurements of AO device efficiency have demonstrated single-pass diffraction efficiencies of >97% and overall efficiency (including losses at antireflection-coated surfaces and absorption in the germanium AOM) of about 95%. Tuning rates of up to 70 kHz have been observed over more than 50 laser lines in the region between 9.2 and 10.8 $\mu$m, with the tuning rate being limited by the response time of the laser gain medium, not of the AO device. The apparatus of FIG. 2 is currently being used in a LIDAR (Light Detection and Ranging) system: the gain medium consists of a waveguide laser having a beam diameter (to $1/e^2$ intensity points) of 4 mm. A 2.5× afocal cylindrical telescope consisting of ZnSe cylindrical lenses having –2" and +5" focal lengths located between the gain medium and the first AOM, as above, is used to expand the beam to a diameter of 10 mm before passing through the two modulators. The resulting spectral resolution of about 580 is sufficient to give lasing on single lines only, even for the closely spaced (~1 $cm^{-1}$) lines of the 9R branch of $CO_2$. Resolution can be increased by increasing the magnification of the telescope. Switching the RF to the AOMs on and off also Q-switches this laser, giving pulses as short as 150 ns, depending on the gain of the laser line. Consistent values of laser output pulse parameters (power, pulse shape, mode quality, beam pointing, etc.) were observed from shot-to-shot (for a given wavelength) as the laser is rapidly tuned.

For single-frequency operation of a laser, it is necessary to provide sufficient spectral discrimination to prevent more than one (longitudinal) cavity mode from lasing, and also to control the cavity length in order to prevent variations in the frequency of the selected mode. The latter control is most often achieved by mounting one of the cavity mirrors on a piezoelectric translator. However, the mechanical inertia of the system limits the control bandwidth and, thus, the amount of stabilization that can be achieved.

Additional embodiments of the present invention permit electronic variation of the optical pathlength of the cavity with response times on the order of a few microseconds. This is accomplished by inserting an electronically adjustable phase difference between the RF signals for the two AO modulators. Since the first-order beam from each modulator is shifted in phase depending on the phase of the acoustic wave, an additional phase difference is imparted to the optical beam on each pass, thereby changing the effective optical length of the cavity, and tuning the laser wavelength over one free spectral range of the cavity.

Since modulation of the acoustic power in the AO modulators is readily achieved, the same AO devices can be used to modulate the loss in the cavity and, in particular, to Q-switch a laser as well as tune it. The speed of Q-switching is determined by the acoustic transit time, but switching has been observed to take a only small fraction of the transit time. This effect is attributed to an increase in the diffraction losses of the cavity as the transverse mode of the laser is disrupted by the acoustic wavefront crossing the beam, thereby increasing the speed with which the mode is turned on or off. While the requirements for high switching speed and high spectral resolution are to some extent contradictory, experiments on $CO_2$ lasers have shown switching times of less than 200 ns accompanied by resolution sufficient to obtain single-line operation with the closely spaced (0.01 $\mu$m) lines of the 9R branch of the $CO_2$ spectrum. Switching times can be much shorter in applications where large transit time is not required. Alternatively, faster switching without loss of spectral resolution can be obtained if the beam size through one AOM is made smaller and the beam through the other is made larger, through the use of a telescope between the two modulators. Since the cavity feedback occurs through the first order in both devices, this type of Q-switching has essentially zero transmission when off. This is a very important attribute for high-gain lasers.

Figure 3:
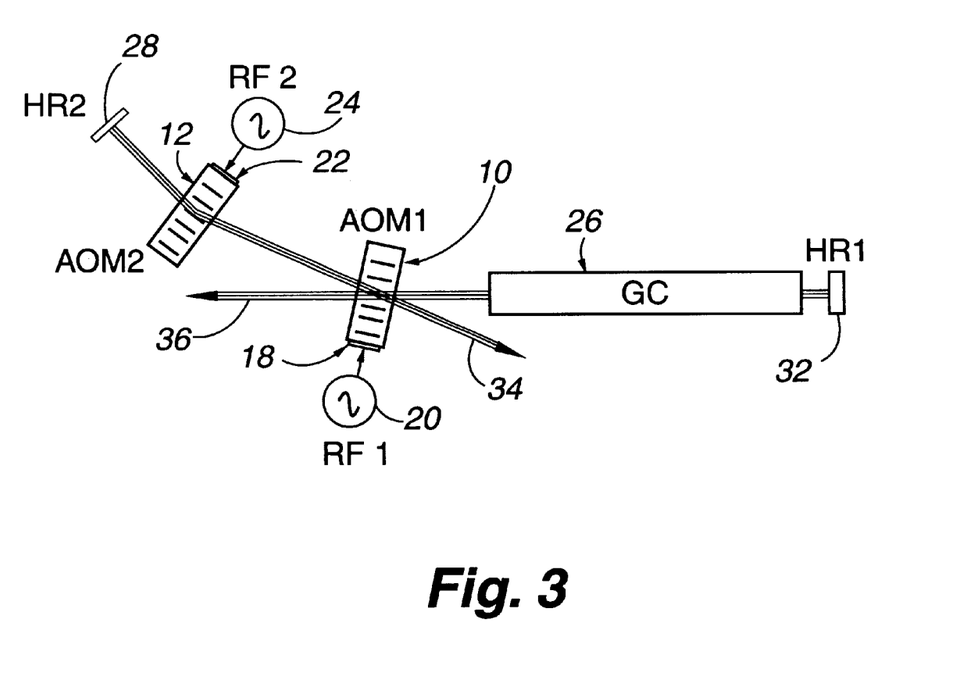
FIG. 3 is a schematic representation of a third embodiment of the tunable laser of the present invention showing the laser cavity including a high-reflectivity mirror, a gain cell, a pair of acoustooptic modulators, and a second high-reflectivity mirror, which replaces the output coupler of FIGS. 1 and 2 hereof.

By reducing the RF power, the efficiency for diffraction of the laser beam into the first order of one of the AO modulators can be reduced, and the undeflected (zero-order) beams from that modulator can be used for out-coupling from the laser. A proposed apparatus is illustrated in FIG. 3 which is a schematic representation of a third embodiment of the tunable laser of the present invention showing the laser cavity including a high-reflectivity mirror, a gain cell, a pair of acoustooptic modulators, and a second high-reflectivity mirror, 32, which replaces the output coupler of FIGS. 1 and 2 hereof. Radio-frequency sources 20 and 24 provide the variable-frequency RF power to generate the acoustic waves in AOM 10 and AOM 20, respectively, and may also include apparatus for modulating the RF power to the AOMs and for shifting the phase of the RF to each device. By adjusting the amplitude of the RF power to AOM 10, the fraction of laser power coupled out of the cavity via the zero-order of AOM 10 may be varied. The apparatus is expected to provide electronically variable output coupling, which can be useful for optimizing out-coupling in tuning over a laser band with widely varying gain. Two output beams, 34 and 36, are generated which might be combined using a polarization beam combiner (not shown in FIG. 3) subsequent to a 90° rotation of the polarization of one beam.

Figure 4:
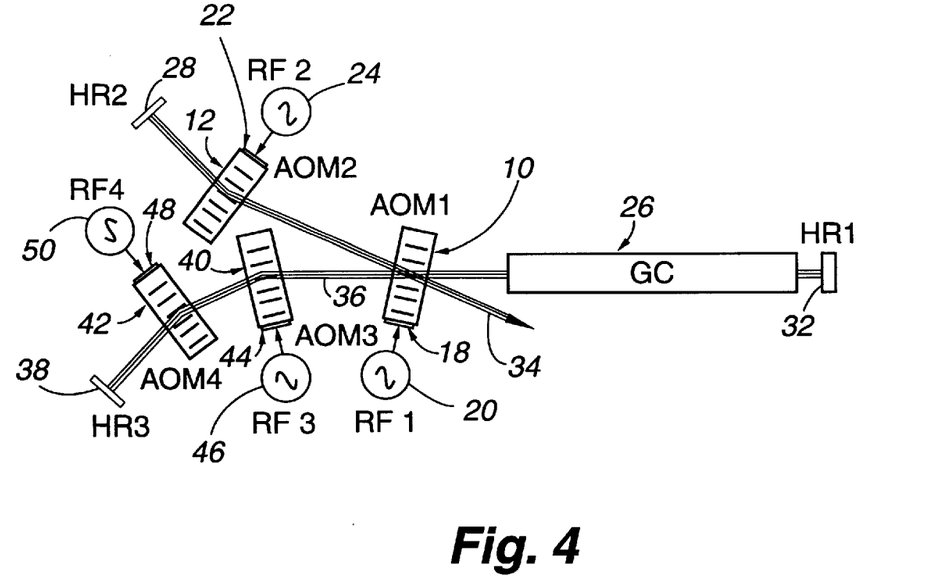
FIG. 4 is a schematic representation of a fourth embodiment of the tunable laser of the present invention showing the laser cavity including a high-reflectivity mirror, a gain cell, and a Michelson interferometer. The interferometer includes an acoustooptic modulator which splits the beam into zero- and first-order components, a second acoustooptic modulator, and a high-reflectivity mirror which form an acoustooptically tuned first leg of the interferometer, and a pair of acoustooptic modulators and a high-reflectivity mirror which form an acoustooptically tuned second leg of the interferometer.

Another embodiment of the invention takes advantage of the phase-shifting properties of AOMs to produce a single output. A proposed apparatus illustrated in FIG. 4 uses four AO modulators, 10, 12, 40, and 42, to produce a single variable output beam, 34. First modulator 10 divides the laser beam into its zero- and first-order components, forming one leg of a Michelson interferometer with AOM 12 and mirror 28. The interferometer includes a second acoustooptic modulator pair, 40 and 42, driven by transducer/RF source combinations, 44/46 and 48/50, respectively, and a high-reflectivity mirror, 38, which form an acoustooptically tuned second leg of the interferometer. Both legs of the interferometer are tuned to the same wavelength and phase shifts in the legs can be adjusted so that both the effective cavity length and the output coupling fraction are controlled. Radio-frequency sources, 20 and 50, provide the variable-frequency RF power to generate the acoustic waves in AOM 10 and AOM 42, respectively. These sources may also include apparatus for modulating the RF power to the AOMs and for shifting the phase of the RF to each device. By adjusting the amplitude of the RF power to AOM 10, the fraction of laser power coupled into the two legs of the interferometer may be varied. By varying the relative phases of the RF to the two pairs of AOMs, the fraction of power coupled out of the cavity 34 and the overall cavity length may be electronically varied.

Figure 5:
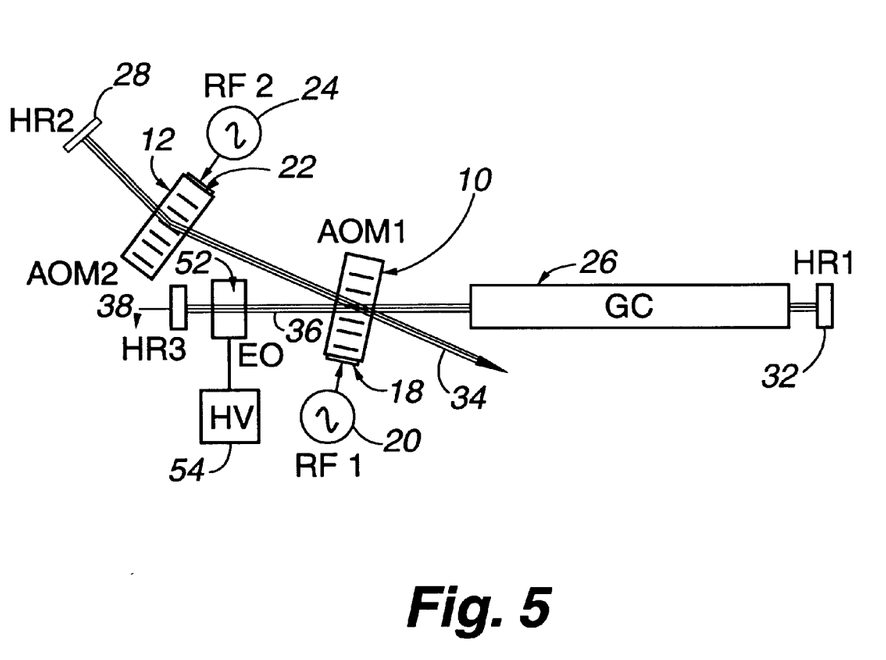
FIG. 5 is a schematic representation of a fifth embodiment of the tuned laser of the present invention showing the laser cavity including a high-reflectivity mirror, a gain cell, and a Michelson interferometer as in FIG. 4 hereof. Unlike FIG. 4, the interferometer is formed by an acoustooptic modulator which splits the beam into zero- and first-order components, a second acoustooptic modulator, and a high-reflectivity mirror which form an acoustooptically tuned first leg of the interferometer, and an electrooptic phase-shifter and high-reflectivity mirror which form the electrooptically tuned second leg of the interferometer.

If faster variation of out-coupling is needed, for example, for cavity dumping, an electrooptic phase-shifter can be inserted into one of the legs. A simpler configuration is shown in FIG. 5 which is a schematic representation of a fifth embodiment of the tuned laser of the present invention showing the laser cavity including a high-reflectivity mirror, a gain cell, and a Michelson interferometer as in FIG. 4 hereof. Unlike FIG. 4, the interferometer is formed by an acoustooptic modulator which splits the beam into zero- and first-order components, a second acoustooptic modulator, and a high-reflectivity mirror which form an acoustooptically tuned first leg of the interferometer, and an electrooptic phase shifter, 52, driven by high-speed switched high-voltage source, 54, and high-reflectivity mirror, 38, which form the electrooptically tuned second leg of the interferometer. In this apparatus, the zero-order leg of the interferometer contains only an electrooptic phase-shifter. This can be used for rapid control of the out-coupling fraction while the two AOM's forming the other leg control the wavelength and cavity length. It is necessary that the round trip laser net gain for the untuned leg alone (including two passes of AOM 10) be less than unity at all wavelengths so that unselected wavelengths cannot lase on the untuned leg of the interferometer alone. For the same reason, it is also necessary that the interaction length of AOM 10 be sufficiently short that the diffraction efficiency is maintained over the laser tuning range. Nonetheless, these conditions may be relatively easily met in many lasers, such as cw-pumped $CO_2$. If out-coupling fractions up to 100% are required, then the amplitudes of the two legs must be equal and the efficiency of AOM 10 must be near 50%. Lower efficiencies (and higher laser gains) are possible if lower maximum out-coupling fractions are acceptable. Radio-frequency sources, 20 and 24, provide the variable-frequency RF power to generate the acoustic waves in AOM 10 and AOM 20, respectively. These may also include apparatus for modulating the RF power to the AOMs and for shifting the phase of the RF to each device. By adjusting the amplitude of the RF power to AOM 10, the fraction of laser power coupled into the two legs of the interferometer may be varied. By varying the relative phase of the RF to the AOMs, the overall cavity length may be electronically varied; and by switching the voltage to the phase-shifter, the fraction of power coupled out of the cavity may be rapidly changed.

It is not necessary that the two AO modulators depicted in FIG. 2 have exactly the same acoustic frequency. If the two modulators are driven at slightly different frequencies, a chirped mode will be produced, similar to that described by Streifer and Whinnery, supra. However, since the frequency shift per pass is the frequency difference, rather than the acoustic frequency of a single device, much smaller chirps are possible. In particular, this would in particular be more compatible with lasers using atomic or molecular transitions, such as $CO_2$ or ion lasers.

The foregoing description of the invention has been presented for purposes of illustration and description and is not intended to be exhaustive or to limit the invention to the precise form disclosed, and obviously many modifications and variations are possible in light of the above teaching. For example, the acoustooptic devices deployed according to the teachings of the present invention can be used to sweep the operation frequency of optical resonators other than those employed for lasers. For instance, placing such a tuner inside a Fabry-Perot cavity can give rapid electronic control of the effective cavity length, and thus the band-pass of the device. The present invention is also useful for order sorting and control of cavity finesse.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A wavelength tunable laser, comprising in combination:
    (a) a reflection grating;
    (b) a gain medium for providing amplification of a laser beam in a chosen wavelength range;
    (c) means for exciting said gain medium;
    (d) a first acoustooptic deflector disposed between said gain medium and said reflection grating for providing a first angular deflection of the laser beam;
    (e) at least one first transducer for generating an acoustic wave in said first acoustooptic deflector;
    (f) a first source of radio-frequency electrical power for providing radio-frequency energy to said at least one first transducer;
    (g) a second acoustooptic deflector disposed between said first acoustooptic deflector and said reflection grating for providing a second angular deflection of the laser beam;
    (h) at least one second transducer for generating an acoustic wave in said second acoustooptic deflector;
    (i) a second source of radio-frequency electrical power for providing radio-frequency energy to said at least one second transducer, wherein said first acoustooptic deflector and said second acoustooptic deflector are disposed such that the direction of the sound waves therein are approximately counterpropagating and no shift occurs in the frequency of the laser beam, while the first angular deflection of the laser beam and the second deflection of the laser beam are additive; and
    (j) an output coupler disposed on the side of said gain medium away from said first acoustooptic deflector such that an optical cavity is formed for supporting amplification of the laser beam in the chosen wavelength range and laser output therefrom, whereby the wavelength of the laser beam is tuned by varying the frequency of said first source of radio frequency and of said second source thereof.

2. The wavelength tunable laser as described in claim 1, wherein the frequency of said first source of radio-frequency electrical power and the frequency of said second source of radio-frequency electrical power are substantially the same.

3. The wavelength tunable laser as described in claim 1, wherein said first acoustooptic deflector and said second acoustooptic deflector are disposed approximately at the Bragg angle relative to the laser beam, and are maintained at approximately the Bragg angle for different wavelengths of the laser beam by tilting the direction of propagation of the acoustic wave generated therein by action of said at least one first transducer and said at least one second transducer, respectively.

4. A wavelength tunable laser, comprising in combination:
 (a) an optical reflector;
 (b) a gain medium for providing amplification of a laser beam in a chosen wavelength range;
 (c) means for exciting said gain medium;
 (d) a first acoustooptic modulator disposed between said gain medium and said optical reflector for providing a first angular deflection of the laser beam;
 (e) at least one first transducer for generating an acoustic wave in said first acoustooptic modulator;
 (f) a first source of radio-frequency electrical power for providing radio-frequency energy to said at least one first transducer;
 (g) a second acoustooptic modulator disposed between said first acoustooptic modulator and said optical reflector for providing a second angular deflection of the laser beam;
 (h) at least one second transducer for generating an acoustic wave in said second acoustooptic modulator;
 (i) a second source of radio-frequency electrical power for providing radio-frequency energy to said at least one second transducer, wherein said first acoustooptic modulator and said second acoustooptic modulator are disposed such that the direction of the sound waves therein are approximately counterpropagating and no shift occurs in the frequency of the laser beam, while the first angular deflection of the laser beam and the second deflection of the laser beam are additive; and
 (j) an output coupler disposed on the side of said gain medium away from said first acoustooptic modulator such that an optical cavity is formed for supporting amplification of the laser beam in the chosen wavelength range and laser output therefrom, whereby the wavelength of the laser beam is tuned by varying the frequency of said first source of radio frequency and of said second source thereof.

5. The wavelength tunable laser as described in claim 4, wherein the frequency of said first source of radio-frequency electrical power and the frequency of said second source of radio-frequency electrical power are substantially the same.

6. The wavelength tunable laser as described in claim 4, wherein said first acoustooptic modulator and said second acoustooptic modulator are disposed approximately at the Bragg angle relative to the laser beam.

* * * * *